US012397705B2

(12) United States Patent
Byrne et al.

(10) Patent No.: US 12,397,705 B2
(45) Date of Patent: Aug. 26, 2025

(54) MOBILE MACHINERY SITUATIONAL AWARENESS APPARATUS

(71) Applicant: DURKIN GILES HOLDINGS PTY LTD, Bendigo (AU)

(72) Inventors: Tobias Byrne, O'Connor (AU); Brendan Tritton, O'Connor (AU); Steven Durkin, O'Connor (AU)

(73) Assignee: DURKIN GILES HOLDINGS PTY LTD, Bendigo (AU)

( * ) Notice: Subject to any disclaimer, the term of this patent is extended or adjusted under 35 U.S.C. 154(b) by 296 days.

(21) Appl. No.: 17/762,305

(22) PCT Filed: Sep. 21, 2020

(86) PCT No.: PCT/AU2020/050996
§ 371 (c)(1),
(2) Date: Mar. 21, 2022

(87) PCT Pub. No.: WO2021/051171
PCT Pub. Date: Mar. 25, 2021

(65) Prior Publication Data
US 2022/0382285 A1     Dec. 1, 2022

(30) Foreign Application Priority Data

Sep. 21, 2019   (AU) ................................ 2019903515

(51) Int. Cl.
*B60Q 1/50*       (2006.01)
*G05D 1/00*       (2024.01)

(52) U.S. Cl.
CPC ............. *B60Q 1/50* (2013.01); *G05D 1/0094* (2013.01); *G05D 1/0214* (2013.01)

(58) Field of Classification Search
CPC .... B60Q 1/50; B60Q 2800/20; B60Q 1/0023; B60Q 1/2615; F16P 3/147; G01S 15/86;
(Continued)

(56) References Cited

U.S. PATENT DOCUMENTS

| | | | | | |
|---|---|---|---|---|---|
| 6,163,253 | A | * | 12/2000 | Yaron | B60Q 9/007 340/436 |
| 2005/0187712 | A1 | * | 8/2005 | Callaghan | B66B 5/0031 701/301 |

(Continued)

FOREIGN PATENT DOCUMENTS

AU     2018202543 A1 * 11/2018

OTHER PUBLICATIONS

International Search Report for International Application No. PCT/AU2020/050996, mailed Nov. 3, 2020, 5 pages.
(Continued)

*Primary Examiner* — Navid Z. Mehdizadeh
*Assistant Examiner* — Shelley Marie Osterhout
(74) *Attorney, Agent, or Firm* — TraskBritt

(57) ABSTRACT

An apparatus for mobile machinery includes a sensor module configured for detachable fitment to mobile machinery, and a control module configured to interface with a control system of the mobile machinery. The sensor module includes an orthogonal sensor arrangement for sensing obstacles in three-dimensional space, an orthogonal indicator arrangement configured to provide a gradient proximity indication of an obstacle, and a wireless transceiver arranged in signal communication with the sensor and indicator arrangements. The control module includes a control wireless transceiver for communicating with the wireless transceiver of the sensor module, and a processor in signal communication with the control wireless transceiver, the processor configured to program, via the wireless transceiver of each sensor module, the sensor and indicator arrangements and with predetermined thresholds of obstacle proximity. If a sensed obstacle proximity exceeds a maximum threshold, the processor overrides the control system to facilitate situational awareness of an operator.

18 Claims, 3 Drawing Sheets

(58) Field of Classification Search
CPC .......... G01S 17/88; G01S 7/003; G01S 15/04; G08B 13/1645; G08B 21/02; G08B 21/182
See application file for complete search history.

(56) References Cited

U.S. PATENT DOCUMENTS

| | | | |
|---|---|---|---|
| 2015/0077236 A1* | 3/2015 | Le Masurier .......... | G08G 1/163 340/435 |
| 2015/0206439 A1* | 7/2015 | Marsden ................ | B64D 47/02 701/301 |
| 2016/0001701 A1 | 1/2016 | Pagliani et al. | |
| 2018/0245315 A1* | 8/2018 | Kaiso ........................ | G06T 7/70 |
| 2018/0274206 A1 | 9/2018 | Kozui et al. | |
| 2018/0316895 A1 | 11/2018 | McClelland et al. | |
| 2018/0319396 A1* | 11/2018 | Foster ............... | B60W 30/0956 |
| 2019/0369648 A1* | 12/2019 | Fang .................... | B64C 39/024 |
| 2022/0289545 A1* | 9/2022 | Bowden ................ | B66F 17/006 |

OTHER PUBLICATIONS

International Written Opinion for International Application No. PCT/AU2020/050996, mailed Nov. 3, 2020, 3 pages.

* cited by examiner

MOBILE MACHINERY SITUATIONAL AWARENESS APPARATUS

CROSS-REFERENCE TO RELATED APPLICATIONS

This application is a national phase entry under 35 U.S.C. § 371 of International Patent Application PCT/AU2020/050996, filed Sep. 21, 2020, designating the United States of America and published as International Patent Publication WO 2021/051171 A1 on Mar. 25, 2021, which claims the benefit under Article 8 of the Patent Cooperation Treaty to Australian Patent Application Serial No. 2019903515, filed Sep. 21, 2019.

TECHNICAL FIELD

This disclosure relates to mobile machinery, in general, and more specifically to apparatus to facilitate situational awareness of an operator of such mobile machinery and associated mobile machinery including such apparatus.

BACKGROUND

The following discussion of the background art is intended to facilitate an understanding of the disclosure only. The discussion is not an acknowledgement or admission that any of the material referred to is or was part of the common general knowledge as at the priority date of the application.

Mobile machinery includes a wide range of machinery designed to perform specific operations in different environments. Examples of such mobile machinery may include agricultural machinery (e.g., sprayers, combine harvesters, forestry equipment, lawnmowers), construction machinery (e.g., lifting and handling equipment, earthmoving machinery, mobile cranes), industrial trucks (e.g., aviation service vehicles, aerial work platforms), municipal machinery (e.g., for street cleaning or snow removal), etc.

Situational awareness for operators of such mobile machinery is particularly problematic, where so-called "inattention blindness" can be present, where an operator of the machinery is focused on a specific work task and becomes temporarily "blind" to what is going on around them.

Accordingly, a shortcoming with mobile machinery is situational awareness, which presents a safety risk to operators and other work personnel in proximity to the machinery. The current disclosure was conceived with this shortcoming in mind.

BRIEF SUMMARY

According to a first aspect of the disclosure, there is an apparatus provided for mobile machinery, the apparatus comprising:
  at least one sensor module configured for detachable fitment to mobile machinery, the sensor module including:
  a) an orthogonal sensor arrangement for sensing obstacles in three-dimensional space relative to the sensor module;
  b) an orthogonal indicator arrangement configured to provide a gradient proximity indication of an obstacle within the three-dimensional space relative to the sensor module; and
  c) a wireless transceiver arranged in signal communication with the sensor and indicator arrangements; and
  a control module configured to interface with an existing control system of the mobile machinery, the control module including:
  i) a control wireless transceiver for communicating with the wireless transceiver of the at least one sensor module; and
  ii) a processor arranged in signal communication with the control wireless transceiver, the processor configured to program, via the wireless transceiver of each sensor module, the sensor and indicator arrangements with predetermined thresholds of obstacle proximity, and if a sensed obstacle proximity exceeds a maximum threshold, to override the control system to prevent unwanted interaction with the obstacle in order to facilitate situational awareness of an operator of the mobile machinery.

Typically, the sensor module is configured for detachable fitment to the mobile machinery by means of suitable attachment means. The skilled addressee is to appreciate that the sensor module is detachable to allow for retro fitment as and when needed to a variety of conventional or existing mobile machinery.

Typically, the suitable attachment means is selected from a group consisting of magnetic attachment, removable fasteners, disposable fasteners, interference-fit fasteners, adhesive and vacuum-operated fasteners.

Typically, the orthogonal sensor arrangement comprises sensors selected from a non-exhaustive group consisting of ultrasonic sensors, radar sensors, and LIDAR sensors.

Typically, the orthogonal sensor arrangement comprises at least three sensors arranged orthogonally on a body of the sensor module, i.e., a sensor per axis, to enable obstacle proximity detection in three-dimensional space relative to the sensor module.

Typically, the orthogonal indicator arrangement comprises a light emitting diodes (LED) arranged on a body of the sensor module.

Typically, the indicator arrangement comprises at least three light emitting diodes (LEDs) arranged orthogonally on the sensor module, i.e., an LED per axis, to indicate a relative proximity of an obstacle.

Typically, the LEDs are configured to provide a gradient proximity indication of an obstacle within the three-dimensional space relative to the sensor module by means of emitting different light intensities and/or light colors.

Typically, the control module is configured to interface with an existing control system of the mobile machinery by means of a control interface.

Typically, the control interface comprises a Deutsch™ DT connector, a Recommended Standard 232 (RS0232) or related interface, a Universal Serial Bus (USB) interface, or the like.

Typically, the control wireless transceiver and wireless transceiver comprises radio transceivers, e.g., within the IEEE radio frequency bands, or the like.

Typically, the processor is configured to program the sensor and indicator arrangements with "safe," "warning" and "danger" thresholds of obstacle proximity.

Typically, the gradient proximity indication of the indicator arrangement corresponds with the predetermined thresholds of obstacle proximity.

Typically, the programmable thresholds of obstacle proximity correspond to user-selectable distances.

Typically, the apparatus includes a slave display configured to provide a corresponding gradient proximity indication of an obstacle within the three-dimensional space relative to the sensor module(s) remotely.

Typically, the slave display is included with the control module and/or comprises a remote display installable inside an operating cab of the mobile machinery.

Typically, the processor is configured to add additional sensor modules, via each respective wireless transceiver, in order to daisy chain sensor modules together, as required.

Typically, the apparatus includes an audible alarm for providing an audible proximity indication of an obstacle within the three-dimensional space relative to the sensor module.

Typically, the audible alarm is configured to provide a gradient proximity indication of an obstacle within the three-dimensional space relative to the sensor module, e.g., different tones, or the like.

Typically, the processor is configured to record instances of obstacles sensed for the at least one sensor module to form a log of sensed obstacles and/or unwanted interactions with the obstacle.

In an embodiment, the sensor module includes an inertial measurement unit (IMU) configured to measure a specific force, angular rate, and/or orientation of the mobile machinery, the processor configured to correlate the IMU measurements with instances of obstacles sensed and to record such correlation in the log.

Typically, the processor is configured to transmit the log, via the control wireless transceiver, to a remote computer system for analysis and reporting purposes.

Typically, the processor is configured to compile a virtual envelope about the mobile machinery according to the log of sensed obstacles, unwanted interactions and/or IMU measurements, the virtual envelope indicative of obstacles within the three-dimensional space about the mobile machinery.

In an embodiment, the processor is configured to record a sequence of control inputs received by the control system and, if a sensed obstacle proximity exceeds a maximum threshold, to automatically override and reverse the recorded sequence of control inputs to the control system, i.e., an auto-return function.

According to a second aspect of the disclosure there is provided mobile machinery having an existing control system, the mobile machinery comprising:
at least one sensor module detachably fitted to the mobile machinery, the sensor module including:
a) an orthogonal sensor arrangement for sensing obstacles in three-dimensional space relative to the sensor module;
b) an orthogonal indicator arrangement configured to provide a gradient proximity indication of an obstacle within the three-dimensional space relative to the sensor module; and
c) a wireless transceiver arranged in signal communication with the sensor and indicator arrangements; and
a control module configured to interface with the existing control system of the mobile machinery, the control module including:
i) a control wireless transceiver for communicating with the wireless transceiver of the at least one sensor module; and
ii) a processor arranged in signal communication with the control wireless transceiver, the processor configured to program, via the wireless transceiver of each sensor module, the sensor and indicator arrangements with predetermined thresholds of obstacle proximity, and if a sensed obstacle proximity exceeds a maximum threshold, to override the control system to prevent unwanted interaction with the obstacle in order to facilitate situational awareness of an operator of the mobile machinery.

Typically, the sensor module is detachably fitted to the mobile machinery by means of suitable attachment means.

Typically, the suitable attachment means is selected from a group consisting of magnetic attachment, removable fasteners, disposable fasteners, interference-fit fasteners, adhesive and vacuum-operated fasteners.

Typically, the orthogonal sensor arrangement comprises ultrasonic sensors.

Typically, the orthogonal sensor arrangement comprises at least three sensors arranged orthogonally on a body of the sensor module, i.e., a sensor per axis, to enable obstacle proximity detection in three-dimensional space relative to the sensor module.

Typically, the orthogonal indicator arrangement comprises a light emitting diode (LED) arranged on a body of the sensor module.

Typically, the indicator arrangement comprises at least three light emitting diodes (LEDs) arranged orthogonally on the sensor module, i.e., an LED per axis, to indicate a relative proximity of an obstacle.

Typically, the LEDs are configured to provide a gradient proximity indication of an obstacle within the three-dimensional space relative to the sensor module by means of emitting different light intensities and/or light colors.

Typically, the control module is configured to interface with an existing control system of the mobile machinery by means of a control interface.

Typically, the control interface comprises a Deutsch™ DT connector, a Recommended Standard 232 (RS0232) or related interface, a Universal Serial Bus (USB) interface, or the like.

Typically, the control wireless transceiver and wireless transceiver comprises radio transceivers, e.g., within the IEEE radio frequency bands, or the like.

Typically, the processor is configured to program the sensor and indicator arrangements with "safe," "warning" and "danger" thresholds of obstacle proximity.

Typically, the gradient proximity indication of the indicator arrangement corresponds with the predetermined thresholds of obstacle proximity.

Typically, the programmable thresholds of obstacle proximity correspond to user-selectable distances.

Typically, the mobile machinery includes a slave display configured to provide a corresponding gradient proximity indication of an obstacle within the three-dimensional space relative to the sensor module(s) remotely.

Typically, the slave display is included with the control module, or comprises a remote display installable inside an operating cab of the mobile machinery.

Typically, the processor is configured to add additional sensor modules, via each respective wireless transceiver, in order to daisy chain sensor modules together, as required.

Typically, the mobile machinery includes an audible alarm for providing an audible proximity indication of an obstacle within the three-dimensional space relative to the sensor module.

Typically, the audible alarm is configured to provide a gradient proximity indication of an obstacle within the three-dimensional space relative to the sensor module.

Typically, the processor is configured to record instances of obstacles sensed for the at least one sensor module to form a log of sensed obstacles and/or unwanted interactions with the obstacle.

In an embodiment, the sensor module includes an inertial measurement unit (IMU) configured to measure a specific force, angular rate, and/or orientation of the mobile machinery, the processor configured to correlate the IMU measurements with instances of obstacles sensed and to record such correlation in the log.

Typically, the processor is configured to transmit the log, via the control wireless transceiver, to a remote computer system for analysis and reporting purposes.

Typically, the processor is configured to compile a virtual envelope about the mobile machinery according to the log of sensed obstacles, unwanted interactions and/or IMU measurements, the virtual envelope indicative of obstacles within the three-dimensional space about the mobile machinery.

In an embodiment, the processor is configured to record a sequence of control inputs received by the control system and, if a sensed obstacle proximity exceeds a maximum threshold, to automatically override and reverse the recorded sequence of control inputs to the control system, i.e., an auto-return function.

BRIEF DESCRIPTION OF THE DRAWINGS

The description will be made with reference to the accompanying drawings in which.

DETAILED DESCRIPTION

Figure 1:
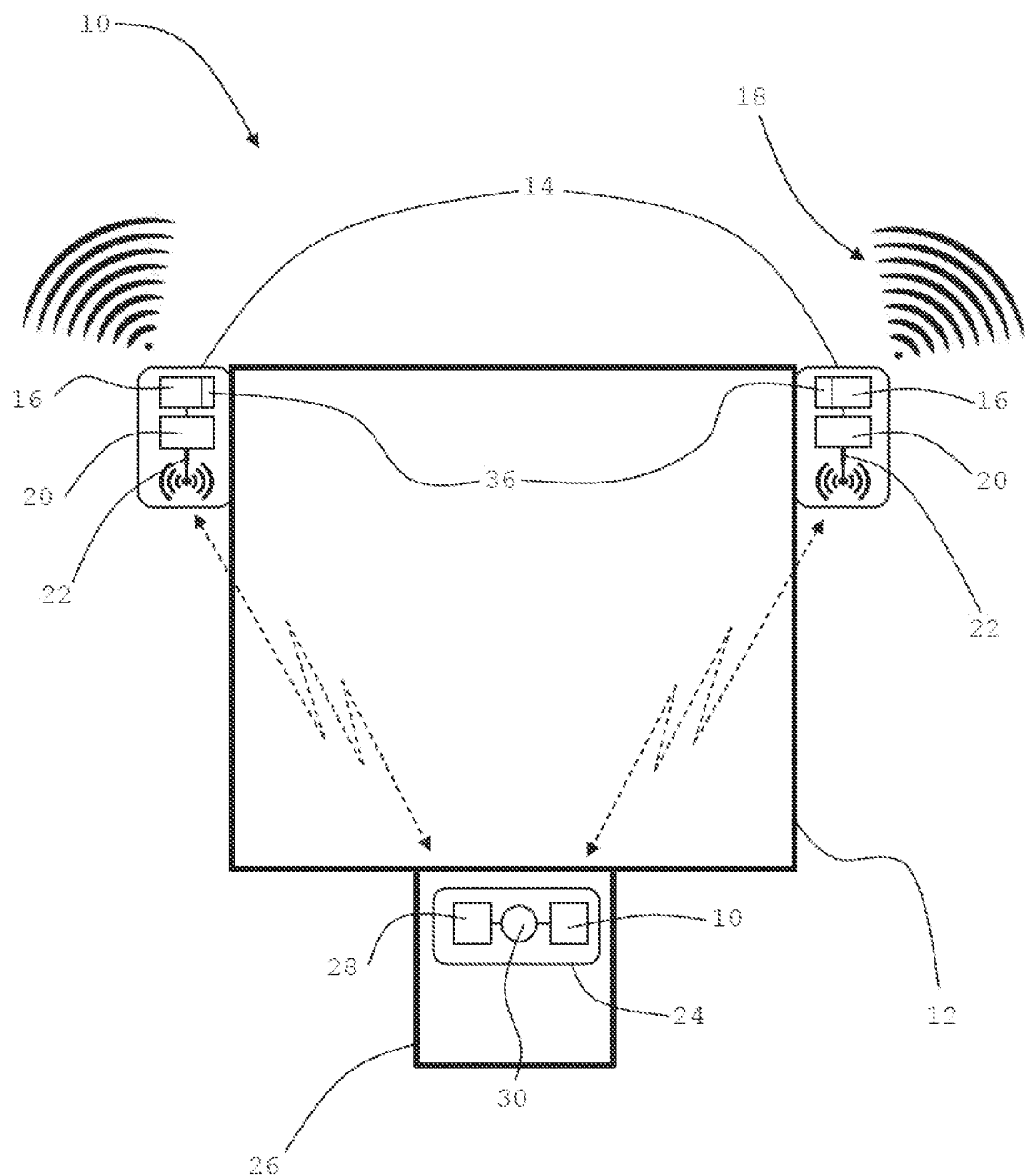
FIG. 1 is a diagrammatic representation of apparatus for mobile machinery, in accordance with an aspect of the disclosure.
Figure 2A:
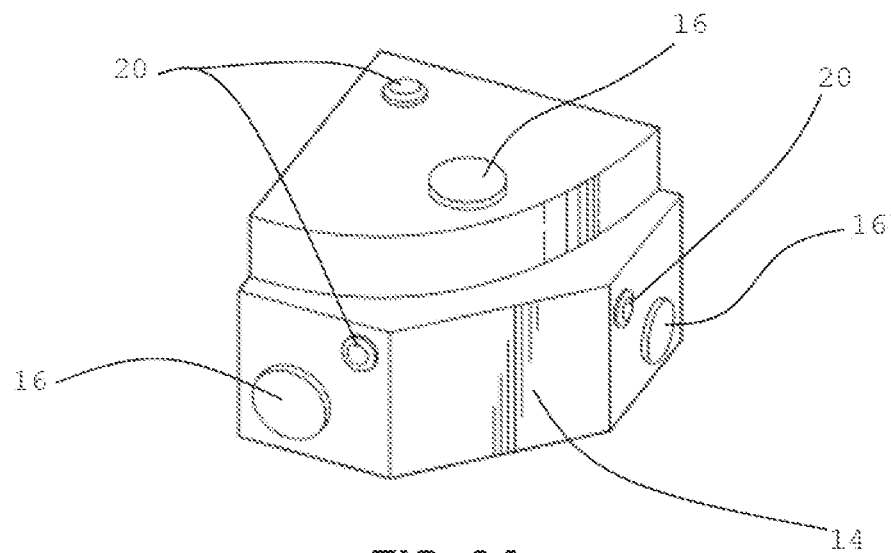
FIG. 2A is a diagrammatic perspective-view representation of a sensor module of the apparatus of FIG. 1.
Figure 2B:
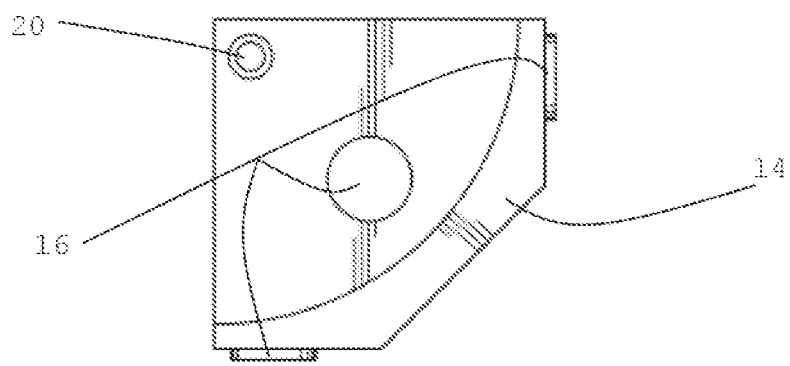
FIG. 2B is a diagrammatic top-view representation of a one sensor module of the apparatus of FIG. 1.
Figure 2C:
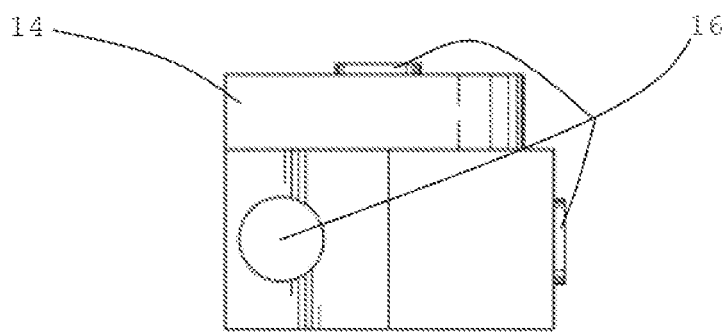
FIG. 2C is a diagrammatic side-view representation of a one sensor module of the apparatus of FIG. 1.

Further features of the disclosure are more fully described in the following description of several non-limiting embodiments thereof. This description is included solely for the purposes of exemplifying the disclosure to the skilled addressee. It should not be understood as a restriction on the broad summary, disclosure or description of the disclosure as set out above. In the figures, incorporated to illustrate features of the example embodiment or embodiments, like reference numerals are used to identify like parts throughout.

Figure 3:
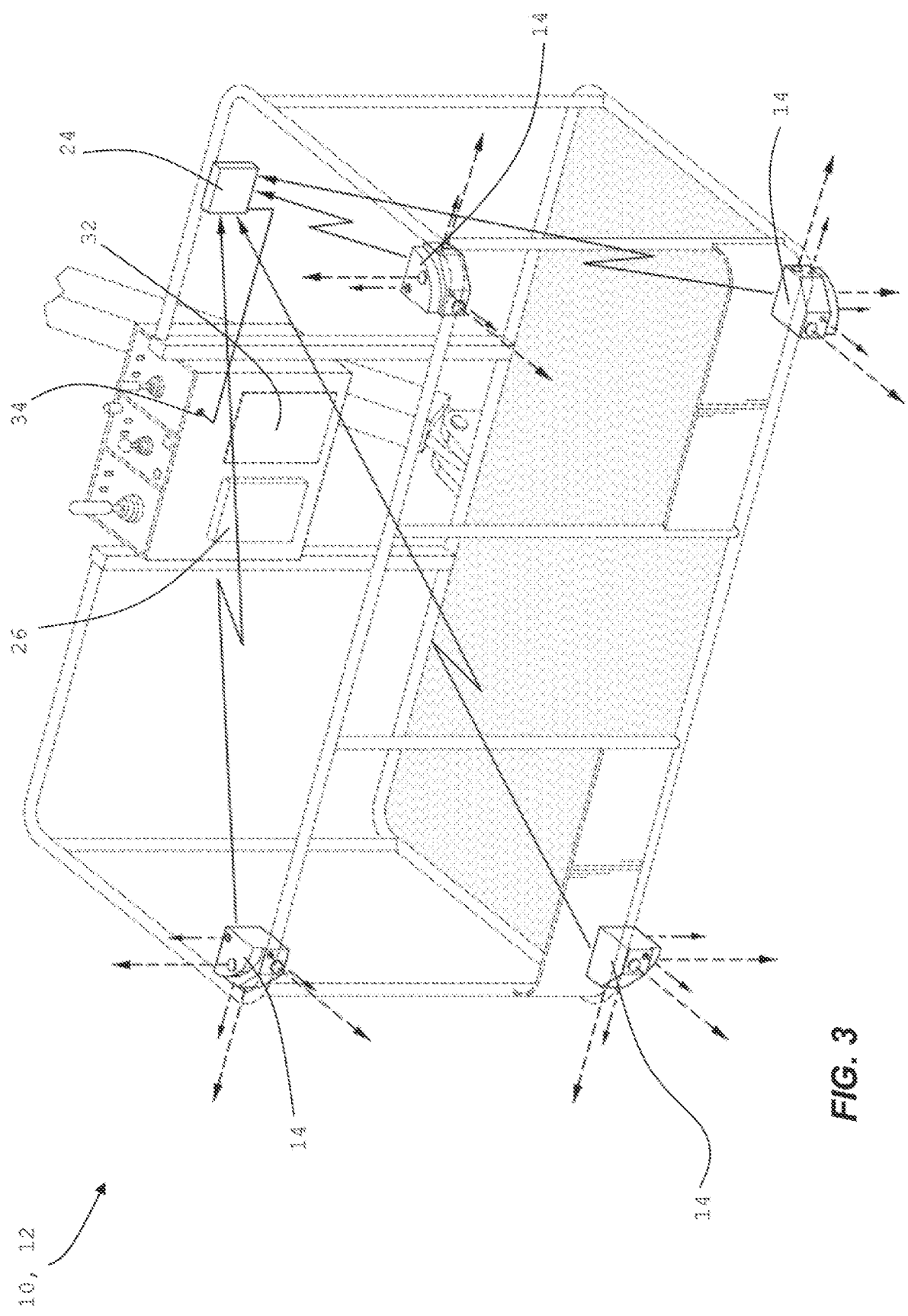
FIG. 3 is diagrammatic perspective-view representation of an example of the apparatus of FIG. 1 fitted to an elevated work platform (EWP) as an example of mobile machinery.

With reference now to the accompanying figures, there is shown one embodiment of apparatus 10 for mobile machinery 12. As described, such mobile machinery can take a variety of forms and apparatus 10 can be used wherever there is a danger of unwanted interaction of a moving part of such machinery with an obstacle, such as an object or person. In the embodiment shown in FIG. 3, the mobile machinery 12 comprises an elevated work platform (EWP), also known as an aerial work platform, but other types of machinery are apposite.

One embodiment of the apparatus 10 generally comprises at least one sensor module 14, which is configured for detachable fitment to the mobile machinery 12. Typically, a plurality of sensor modules 14 are fitted to the mobile machinery 12.

The sensor module 14 is typically configured for detachable fitment to the mobile machinery 12 by means of suitable attachment means. The skilled addressee is to appreciate that the sensor module 14 is detachable to allow for retro fitment as and when needed to a variety of conventional or existing mobile machinery, i.e., can be applied to various machinery and can be re-used between machinery. Accordingly, the suitable attachment means may include any suitable magnetic attachment, removable fasteners (e.g., nuts and bolt), disposable fasteners (e.g., zip ties, cable ties), interference-fit fasteners (e.g., press-fittings), adhesive (e.g., double-sided tape) and vacuum-operated fasteners (e.g., suction cups).

The sensor module 14 generally includes a) an orthogonal sensor arrangement 16 for sensing obstacles in three-dimensional space (indicated by reference numeral 18) relative to the sensor module 14, b) an orthogonal indicator arrangement 20 configured to provide a gradient proximity indication of an obstacle within the three-dimensional space 18 relative to the sensor module 14, and c) a wireless transceiver 22 arranged in signal communication with the sensor and indicator arrangements 16 and 20.

The skilled addressee will appreciate that reference to orthogonal generally refers to an orthogonal 3-axis arrangement, e.g., x, y and z-axes representative of three-dimensional space, as required.

The orthogonal sensor arrangement 16 typically comprises at least three sensors arranged orthogonally on a body of the sensor module 14, i.e., a sensor per axis, to enable obstacle proximity detection in three-dimensional space 18 relative to the sensor module 14, as shown. Variations hereon are possible and within the scope of the disclosure.

Similarly, in one embodiment the orthogonal indicator arrangement 20 comprises a light emitting diode (LED) arranged on a body of the sensor module 14, as shown. Of course, variations hereon are possible and within the scope of the disclosure, e.g., another form of visual indicator, or the like.

Typically, the indicator arrangement 20 comprises at least three light emitting diodes (LEDs) arranged orthogonally on the sensor module 14, i.e., an LED per axis, to indicate a relative proximity of an obstacle. It is to be appreciated that having an LED on each axis facilitates an operator in quickly and easily determining of an obstacle is proximate a sensor module 14.

The LEDs are typically configured to provide a gradient proximity indication of an obstacle within the three-dimensional space relative to the sensor module by means of emitting different light intensities and/or light colors. For example, "safe," "warning" and "danger" thresholds of obstacle proximity (described in more detail below) may be represented by green, orange and red colors, respectively. Similarly, light intensity or brightness can be varied to provide the gradient, etc.

In one embodiment, the apparatus 10 also includes an audible alarm (not shown) for providing an audible proximity indication of an obstacle within the three-dimensional space 18 relative to the sensor module 14. Similarly, the audible alarm may be configured to provide a gradient proximity indication of an obstacle within the three-dimensional space relative to the sensor module, e.g., increasing frequency, or tempo, etc.

Apparatus 10 further includes a control module 24, which is configured to interface with an existing control system 26 of the mobile machinery 12. The control module 24 includes i) a control wireless transceiver 28 for communicating with the wireless transceiver 22 of the sensor modules 14, and ii) a processor 30 arranged in signal communication with the control wireless transceiver 28.

The processor 30 is generally configured to program, via the wireless transceiver 22 of each sensor module 14, the sensor and indicator arrangements 16 and 20 with predetermined thresholds of obstacle proximity, and if a sensed obstacle proximity exceeds a maximum threshold, to override the control system 26 to prevent unwanted or inadvertent interaction with the obstacle, i.e., a collision, in order to facilitate situational awareness of an operator of the mobile machinery 12. The skilled addressee will appreciate that such programming of the sensor module 14 by the processor 30 can take a variety of forms, as is generally known in the art of computer science.

In one embodiment, the orthogonal sensor arrangement 16 comprises ultrasonic sensors, but other sensors are apposite, requirements dependent, e.g., RADAR, LIDAR, etc. As such, any suitable form of electromagnetic wave transmission/reception sensor useable to determine a range of an obstacle may be used, requirements dependent.

The control module 24 is typically configured to interface with the existing control system 26 of the mobile machinery 12 by means of a control interface 34. Typically, the control interface 34 comprises a Deutsch™ DT connector, a Recommended Standard 232 (RS0232) or related interface, a Universal Serial Bus (USB) interface, or the like. The control wireless transceiver 28 and wireless transceiver 22 typically comprises radio transceivers, e.g., within the IEEE radio frequency bands, or the like.

In one embodiment, the processor 30 is configured to program the sensor and indicator arrangements 16 and 20 with "safe," "warning" and "danger" thresholds of obstacle proximity. Accordingly, the gradient proximity indication of the indicator arrangement 20 corresponds with the predetermined thresholds of obstacle proximity. For example, depending on use of the mobile machinery 12, the "safe" threshold may be for obstacles further than 5 m, the "warning" threshold for obstacles within 2-5 m, and the "danger" threshold, where the controller 30 overrides the control system 26, for obstacles that come within 1 m of a sensor module 14. Accordingly, the programmable thresholds of obstacle proximity generally correspond to user-selectable distances, which can be programmed via the controller 30, as described.

In one embodiment, the apparatus 10 includes a slave display 32, which is configured to provide a corresponding gradient proximity indication of an obstacle within the three-dimensional space 18 relative to a sensor module(s) 14 remotely. The slave display 32 can be included with the control module 24, and/or comprise a remote display installable inside an operating cab of the mobile machinery 12, or the like.

As will be appreciated by the skilled addressee, the processor 30 generally comprises any suitable processor or microcontroller configured to receive input, perform logical and arithmetical operations on a suitable instruction set, and provide output, as well as transitory and/or non-transitory electronic storage, e.g., a programmable logic controller (PLC), or the like.

Importantly, the processor 30 is generally configured to add additional sensor modules 14, via each respective wireless transceiver 22, in order to daisy chain sensor modules together, as required. For example, one type of mobile machinery 12 may benefit from two sensor modules 14, where another type of mobile machinery 12 benefits from six sensor modules 14. The processor 30 is configured to accommodate such a varying number of sensor modules 14 according to requirements.

As such, the apparatus 10 can be used between various types of mobile machinery, as and when required, as apparatus 10 can be adapted to suit the requirements of a particular piece of machinery. For example, an elevated work platform, such as a "cherry picker" can have a basket thereof fitted with four sensor modules 14 as necessary, after which the same apparatus 10 can be used on a forklift needing only two sensor modules 14, for example, or the like.

In one embodiment, the processor 30 is configured to record instances of obstacles sensed for the at least one sensor module 14 in order to form, produce or compile a log of sensed obstacles and/or unwanted interactions with the obstacle. In another embodiment, the sensor module 14 may also include an inertial measurement unit (IMU) 36 configured to measure a specific force, angular rate, and/or orientation of the mobile machinery 12. The processor 30 is also then configured to correlate the IMU measurements with instances of obstacles sensed and to record such correlation in the log.

The processor 30 is typically configured to transmit the log, via the control wireless transceiver 28, to a remote computer system for analysis and reporting purposes. For example, the log can be downloaded by means of a suitable application or "app," which enables review of machine performance and use, as well as provide an auditable record of such performance and use.

In a yet further embodiment, the processor 30 is configured to compile a virtual envelope about the mobile machinery 12 according to the log of sensed obstacles, unwanted interactions and/or IMU measurements. Such a virtual envelope is indicative of obstacles within the three-dimensional space about the mobile machinery 12. For example, the processor 30 can be configured to automatically compile the virtual envelope about the machinery as the machinery operates. The virtual envelope compiled in this manner then forms a virtual map of obstacles about the mobile machinery 12 to facilitate automatic avoidance of obstacles and associated unwanted interactions.

In another embodiment, the processor 30 is also configured to record a sequence of control inputs received by the control system and, if a sensed obstacle proximity exceeds a maximum threshold, to automatically override and reverse the recorded sequence of control inputs to the control system, i.e., an auto-return function. For example, if an elevated work platform is required to enter a space requiring specific (and often skillful) maneuvering, an operator can instruct the processor 30 to record the sequence of control inputs. When required to return, the operator can activate the auto-return function, which automatically maneuvers the machinery back to a point of origin. Such auto-return can also occur when an unwanted interaction occurs.

Applicant believes is particularly advantageous that the disclosure provides for apparatus 10, which can be retrofitted to any type of mobile machinery 12 and which is programmable according to requirements, i.e., user-selectable proximity thresholds, along with the ability to add/remove sensor modules 14 as necessary.

Optional embodiments of the disclosure may also be said to broadly consist in the parts, elements and features referred to or indicated herein, individually or collectively, in any or all combinations of two or more of the parts, elements or features, and wherein specific integers are mentioned herein, which have known equivalents in the art to which the disclosure relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a," "an," "said," "the," and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is to be appreciated that reference to "one example" or "an example" of the disclosure, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the disclosure, whilst other aspects are exemplified in a different example. These examples are intended to assist the skilled person in performing the disclosure and are not intended to limit the overall scope of the disclosure in any way unless the context clearly indicates otherwise. Variations (e.g., modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

The invention claimed is:

1. An apparatus for mobile machinery, comprising:
at least one sensor module configured for detachable fitment to the mobile machinery, the at least one sensor module including:
a first sensor configured to sense obstacles in a three-dimensional space relative to the at least one sensor module;
a second sensor disposed orthogonally to the first sensor and configured to sense obstacles in the three-dimensional space relative to the at least one sensor module;
a third sensor disposed orthogonally to the first sensor and to the second sensor and configured to sense obstacles in the three-dimensional space relative to the at least one sensor module;
a first indicator corresponding to the first sensor, the first indicator comprising a first light emitting diode ("LED") disposed on a body of the at least one sensor module, the first LED configured to provide a gradient proximity indication of a relative proximity of an obstacle in a first direction within the three-dimensional space relative to the at least one sensor module;
a second indicator corresponding to the second sensor, the second indicator comprising a second LED disposed on the body of the at least one sensor module, the second LED configured to provide a gradient proximity indication of a relative proximity of an obstacle in a second direction within the three-dimensional space relative to the at least one sensor module, the second direction orthogonal to the first direction;
a third indicator corresponding to the third sensor, the third indicator comprising a third LED disposed on the body of the at least one sensor module, the third LED configured to provide a gradient proximity indication of a relative proximity of an obstacle in a third direction within the three-dimensional space relative to the at least one sensor module, the third direction orthogonal to the first direction and the second direction, the first indicator, the second indicator, and the third indicator providing the gradient proximity indication via one or more of emitting different light intensities and light colors; and
a wireless transceiver arranged in signal communication with the first sensor, the second sensor, the third sensor, the first indicator, the second indicator and the third indicator; and
a control module configured to interface with an existing control system of the mobile machinery, the control module including:
a control wireless transceiver for communicating with the wireless transceiver of the at least one sensor module; and
a processor arranged in signal communication with the control wireless transceiver, the processor configured to program, via the wireless transceiver of the at least one sensor module, the first sensor, the second sensor, the third sensor, the first indicator, the second indicator, and the third indicator with predetermined thresholds of obstacle proximity, and if a sensed obstacle proximity is within one or more of the predetermined thresholds, to override the control system to prevent unwanted interaction with the obstacle in order to facilitate situational awareness of an operator of the mobile machinery.

2. The apparatus of claim 1, wherein the at least one sensor module is configured for detachable fitment to the mobile machinery by means of suitable attachment means selected from a group consisting of magnetic attachment, removable fasteners, disposable fasteners, interference-fit fasteners, adhesive and vacuum-operated fasteners.

3. The apparatus of claim 1, wherein the first sensor, the second sensor, and the third sensor each comprise a sensor selected from a group comprising ultrasonic sensors, radar sensors, and LIDAR sensors.

4. The apparatus of claim 1, wherein the control module is configured to interface with the existing control system of the mobile machinery by means of a control interface.

5. The apparatus of claim 1, wherein the predetermined thresholds of obstacle proximity comprise "safe," "warning," and "danger" thresholds of obstacle proximity, and wherein the predetermined thresholds of obstacle proximity are user-selectable distances.

6. The apparatus of claim 1, wherein the gradient proximity indication of the first indicator, the second indicator, and the third indicator corresponds with the predetermined thresholds of obstacle proximity.

7. The apparatus of claim 1, further comprising a slave display configured to provide a corresponding gradient proximity indication of an obstacle within the three-dimensional space relative to the at least one sensor module remotely, wherein the slave display is included with the control module, or comprises a remote display installable inside an operating cab of the mobile machinery.

8. The apparatus of claim 1, wherein the processor is configured to add at least one additional sensor module, via each respective wireless transceiver, in order to daisy chain the at least one sensor module and the at least one additional sensor module together.

9. The apparatus of claim 1, further comprising an audible alarm for providing an audible proximity indication of an obstacle within the three-dimensional space relative to the at least one sensor module.

10. The apparatus of claim 9, wherein the audible alarm is configured to provide an additional gradient proximity indication of the obstacle within the three-dimensional space relative to the at least one sensor module.

11. The apparatus of claim 1, wherein the processor is configured to record instances of obstacles sensed by the at least one sensor module to produce a log of one or more of sensed obstacles and unwanted interactions with obstacles.

12. The apparatus of claim 11, wherein the at least one sensor module includes an inertial measurement unit ("IMU") configured to measure one or more of a specific force, angular rate, and orientation of the mobile machinery, the processor configured to correlate the IMU measurements with the instances of obstacles sensed and to record such correlation in the log.

13. The apparatus of claim 12, wherein the processor is configured to transmit the log, via the control wireless transceiver, to a remote computer system for analysis and reporting purposes.

14. The apparatus of claim 12, wherein the processor is configured to compile a virtual envelope about the mobile machinery according to the log of one or more of sensed obstacles, unwanted interactions, and IMU measurements, the virtual envelope indicative of obstacles within the three-dimensional space about the mobile machinery.

15. The apparatus of claim 1, wherein the processor is configured to record a sequence of control inputs received by the control system and, if the sensed obstacle proximity is within the one or more of the predetermined thresholds, to automatically override and reverse the recorded sequence of control inputs to the control system.

16. Mobile machinery comprising the apparatus of claim 1.

17. The apparatus of claim 1, wherein the first LED and the first sensor are disposed on a first surface of the sensor module,
the second LED and the second sensor are disposed on a second surface of the sensor module that is orthogonal to the first surface,
the third LED and the third sensor are disposed on a third surface of the sensor module that is orthogonal to the first surface and the second surface.

18. Mobile machinery comprising:
an elevated work platform;
at least two sensor modules disposed at edges of the elevated work platform, each sensor module of the at least two sensor modules comprising:
  a first sensor and a first indicator comprising a first light emitting diode ("LED") corresponding to the first sensor, the first sensor and the first indicator disposed on a first surface of the sensor module, the first sensor configured to sense obstacles in a three-dimensional space, and the first LED configured to provide a gradient proximity indication of a relative proximity of an obstacle in a first direction within the three-dimensional space;
  a second sensor and a second indicator comprising a second LED corresponding to the second sensor, the second sensor and the second indicator disposed on a second surface of the sensor module, the second surface being orthogonal to the first surface, the second sensor configured to sense obstacles in the three-dimensional space, the second LED configured to provide a gradient proximity indication of a relative proximity of an obstacle in a second direction within the three-dimensional space, and the second direction being orthogonal to the first direction;
  a third sensor and a third indicator comprising a third LED corresponding to the third sensor, the third sensor and the third indicator disposed on a third surface of the sensor module, the third surface being orthogonal to the first surface and the second surface, the third sensor configured to sense obstacles in the three-dimensional space, the third LED configured to provide a gradient proximity indication of a relative proximity of an obstacle in a third direction within the three-dimensional space, and the third direction being orthogonal to the first direction and the second direction; and
  a wireless transceiver arranged in signal communication with the first sensor, the second sensor, the third sensor, the first indicator, the second indicator and the third indicator; and
a control module including:
  a control wireless transceiver for communicating with the wireless transceiver of each sensor module of the at least two sensor modules; and
  a processor arranged in signal communication with the control wireless transceiver, the processor configured to program, via the wireless transceiver of each sensor module of the at least two sensor modules, the first sensor, the second sensor, the third sensor, the first indicator, the second indicator, and the third indicator with predetermined thresholds of obstacle proximity, and if a sensed obstacle proximity is within one or more of the predetermined thresholds, to prevent unwanted interaction with the obstacle in order to facilitate situational awareness of an operator of the mobile machinery.

* * * * *

UNITED STATES PATENT AND TRADEMARK OFFICE
CERTIFICATE OF CORRECTION

| | | |
|---|---|---|
| PATENT NO. | : 12,397,705 B2 | |
| APPLICATION NO. | : 17/762305 | |
| DATED | : August 26, 2025 | |
| INVENTOR(S) | : Tobias Byrne, Brendan Tritton and Steven Durkin | |

It is certified that error appears in the above-identified patent and that said Letters Patent is hereby corrected as shown below:

In the Claims

Claim 17, Column 11, Lines 59-60, change "wherein the first LED" to --wherein the first LED--

Claim 17, Column 11, Line 64, change "first surface," to --first surface, and--

Signed and Sealed this
Thirtieth Day of September, 2025

John A. Squires
*Director of the United States Patent and Trademark Office*